Oct. 8, 1940.   F. K. ZERBE   2,217,090
METHOD OF MAKING MULTI-LAYER PRESSURE VESSELS
Filed May 7, 1938
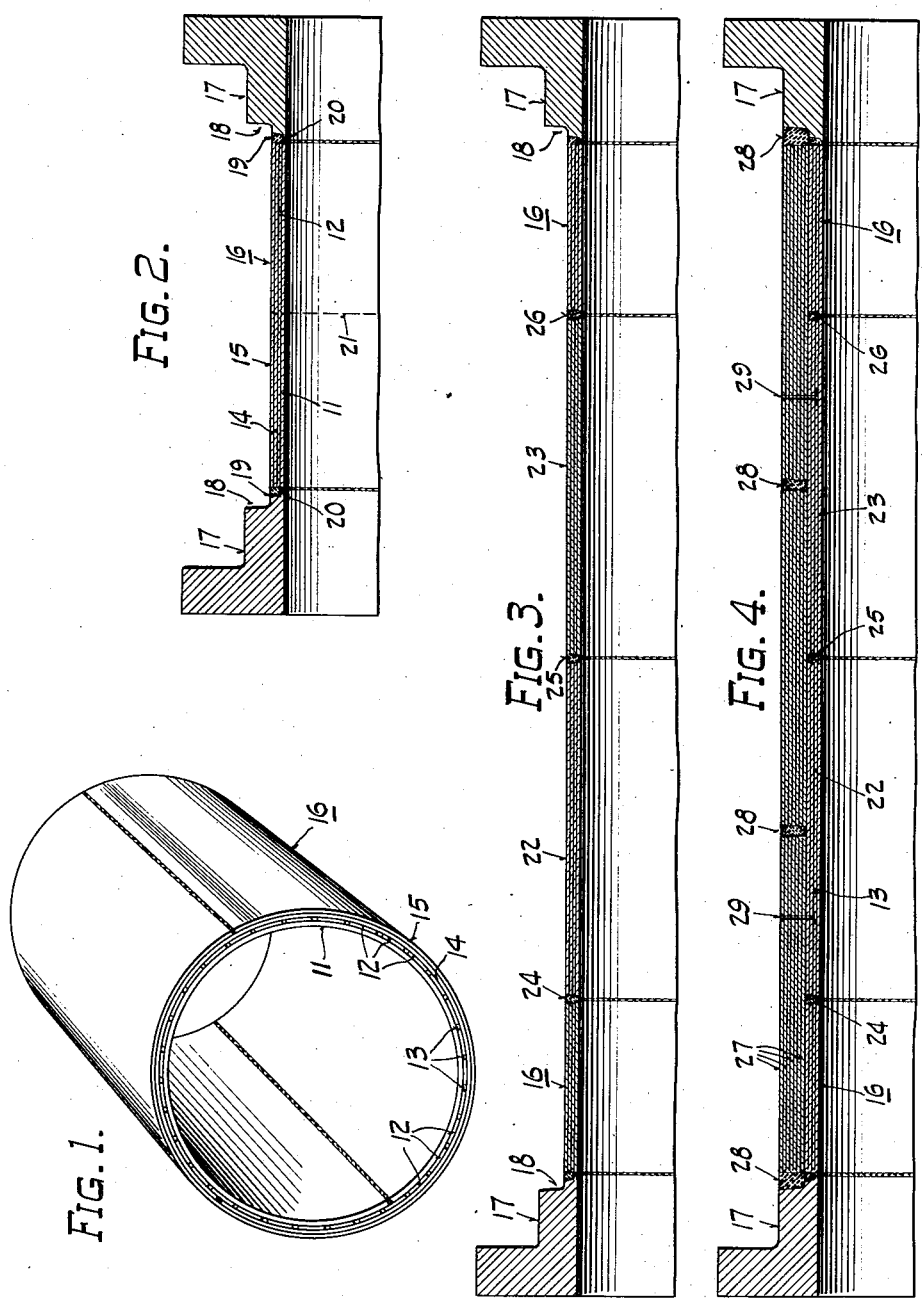
Frederick K. Zerbe
INVENTOR.
BY
ATTORNEY.

Patented Oct. 8, 1940

2,217,090

UNITED STATES PATENT OFFICE 2,217,090

METHOD OF MAKING MULTILAYER PRESSURE VESSELS

Frederick K. Zerbe, Granville, Wis., assignor to A. O. Smith Corporation, Milwaukee, Wis., a corporation of New York Application May 7, 1938, Serial No. 206,525

2 Claims. (Cl. 29—148.2)

This invention relates to an improved method of making multilayer pressure vessels of the character disclosed in United States Letters Patent No. 1,925,118 issued on September 5, 1933, to Richard Stresau.

It is an object of the present invention to provide an improved method of making a vessel of layer construction wherein the innermost layer or layers are formed from an alloy steel having a different composition than the steel used in forming the outer layers. One of the great advantages of a layer constructed vessel is the fact that the inner layer or layers may be formed of an alloy steel possessing high resistance characteristics to corrosion and to hydrogen embrittlement, while the outer layers which increase the strength of the vessel, may be formed from plain carbon steel which is cheaper and need not possess these characteristics.

Another object of the invention is to provide a method of manufacturing vessels of the class described which effects great economies in manufacturing operations performed.

A further object of the invention is to provide a method of manufacturing layer vessels which are equipped with extended neck portions at the ends of the vessel, forged from solid steel which simplifies certain inside machining operations.

This application is a continuation-in-part of my co-pending application Serial No. 196,768 filed March 18, 1938, in which I have disclosed a multilayer vessel with improved characteristics for adaption to hydrogenation processes. Although the present invention is particularly applicable to the manufacture of vessels disclosed in said application, its principles may be equally well applied to the manufacture of layer vessels used in other processes.

Reference is made to the accompanying drawing in which:

Figure 1 is an isometric view of a ring section showing details of construction;

Fig. 2 is a longitudinal sectional view of the ring shown in Fig. 1 disposed between two end forgings, parts being broken away:

Fig. 3 is a longitudinal sectional view of the structure shown in Fig. 2 with the ring cut in the middle and additional rings inserted between the severed sections; and Fig. 4 is a longitudinal sectional view of the completely fabricated vessel, parts being broken away.

In the drawing the vessel is shown in tubular form with flanged end sections made from forgings. It will be understood that heads will be provided to close the vessel having flanges fitting against the end surface of the sections shown. Ellipsoidal heads may be employed, which are welded integrally to the ring sections where removal of the heads is not required. In the latter construction suitable manways or nozzles will be provided. The reason the closures used with these vessels are usually detachable is because the diameter of layer vessels is generally less than that of other types of pressure vessels, and because it is frequently desirable to insert a catalyst containing cartridge in the vessel.

The first step in the process of manufacturing the vessel is the formation of the ring section illustrated in Figure 1. This section comprises an inner layer 11 of alloy steel possessing resistance to corrosion and embrittlement from gases. A suitable alloy composition for this purpose is a chrome-vanadium steel having approximately 1.5% chrome and .20-.25% vanadium, with carbon content maintained at approximately .20%. Hereafter in describing the heat treatment used, it will be understood reference is made to this alloy, although with other alloys similar results may be obtained provided the principles of this invention are followed.

The ring is formed by rolling a sheet of metal into tubular form and welding the longitudinal seam between the meeting edges. Alloy strips 12 are then tack welded to the outer surface of the ring, forming parallel longitudinal spaces 13 therebetween as disclosed in my co-pending application above referred to. Another sheet 14 of alloy steel is rolled and drawn tightly over the strips 12 covering the inner ring and, while tightly clamped, is welded along the longitudinal seam. In welding seams of alloy steel rings, preheating the steel to about 300° F. is considered desirable practice. The next ring 15 is formed in a similar manner as rings 11 and 14, and welded along the longitudinal seam, but this ring may be of plain carbon steel without danger of embrittlement from gas absorbtion provided it is protected in the manner disclosed in the co-pending application above noted.

Immediately after welding each longitudinal seam of the ring structure 16, just described, the partially fabricated ring section is stress relieved at 1200° F. and then allowed to cool to room temperature.

Ring section 16 is next placed in alignment between two flanged end sections 17 of alloy steel. The end sections have been previously rough machined, thoroughly annealed and provided with a scarf or welding groove 18 outside the ring section and facing the layers to be added.

To facilitate welding ring sections to end sections a small groove 19 may be provided in the forging, extending from the groove 18 for a suitable depth. At the bottom of the groove 19 is a lip 20 which abuts against the end of the ring section. Weld metal of a composition similar to the alloy steel in the ring and forgings is used in arc welding in grooves 19.

After welding ring section 16 between end forgings 17, a circumferential cut is made through the ring about midway thereof, as at 21, and the inside surfaces of the end forgings on the two sections thus formed are machined to accurate dimensions. The particular advantage in the practice outlined lies in the fact that this machining may be done while the vessel axis is vertical and without extending the tool a great distance inside the vessel.

Similar results may be obtained by forming two shorter ring sections and welding each to the inner end of the forgings 17. After arc depositing in the groove 19, the weld is immediately stress relieved by heat treatment. Such heat treatment may deform the forgings and consequently the final machining operation should be performed subsequent to heat treating.

Where machining equipment such as is used in boring and reaming long tubular structures is available in the shop, it is not necessary to cut through the ring section, but the desired number of rings may be assembled together in the first instance. In this practice, the machining operation will be subsequent to the welding of the outer layers to the head to avoid deformation arising therefrom.

A number of ring sections 22 and 23 are made in the same manner as ring 16 and placed end to end to form a tubular body section of the desired length. In Fig. 3, two such ring sections are shown placed between the stubs of ring 16 and the end forgings 17. Alloy weld metal is deposited along the circumferential seam 24 joining ring sections 22 and 23 and heat treatment then applied. Seams 25 and 26 are next welded and these seams are locally stress relieved to prevent re-heating the forgings.

Where machining equipment is available to enter a long tubular member, the ring sections 16, 22 and 23 will be joined together first, the welding of seams 24, 25 and 26 progressing simultaneously in order that there may be as little delay in heat treatment following welding as possible. The long tubular section formed by rings 16, 22 and 23 will next be welded to the end forgings and treated in the manner previously described.

Whether a single ring section is welded between the end forgings as here described, or whether the final desired number of such sections are inserted as one long tubular member, it is highly important to recondition the metal by heat treatment prior to performing any other operations.

The ring sections as thus formed have one layer of carbon steel enclosing the alloy steel shell. In welding the seams of the plain steel layer which contact with the surface of the alloy shell, the heat caused by the welding operations hardens the alloy steel and the metal must be heat treated to remove this hardness.

The temperature during heat treatment should not exceed the critical temperature, unless slow-controlled cooling conditions can be maintained. Where the alloy plate has been conditioned prior to fabrication by a carefully controlled annealing process, it is desirable to save the expense of repeating this operation, and to accomplish this the temperature should be maintained below the critical range; 1200°–1250° F. is generally sufficient with the alloy herein specified. To insure proper heat treatment, this temperature should be maintained for at least one hour for each inch of wall thickness in the ring section.

Following the formation of the shell section 10 with end forgings joined thereto, the ends are closed and fluid pressure is applied to make sure that all seams are leak proof.

To complete the vessel, layers 27 of plain carbon steel are formed, wrapped around the inner shell and welded along the longitudinal seam while held in tightly clamped position. Circumferential seams 28 are then welded uniting the super imposed ring sections and the end forgings. Longitudinal seams may be circumferentially spaced or disposed in coinciding relation throughout the entire vessel, but circumferential spacing is preferred for reasons set forth in the Stresau patent. Weap holes 29 may be provided in the outer layers as disclosed in the Stresau patent to permit the escape of air in forming layers together and to detect if leaks occur in the inner shell.

The layer 15 and the outer layers 27 of the vessel have been described as being of plain carbon steel. Plain carbon steel, because of its ductility and good welding qualities is desirable for the purposes herein specified. It is contemplated, however, that many other steels having high strength may be employed in the outer layers. By following the method of manufacture here disclosed, heat treating welds in the outer layers of the vessel is unnecessary provided the metal selected for such layers is not unduly hardened by air cooling following the welding operations. Where operating conditions require the selection of an alloy steel in the inner layers which must be heat treated after welding, the present invention provides a highly advantageous method of manufacture.

The invention having been described what is claimed is:

1. The method of fabricating the wall of a multilayer pressure vessel suitable for containing fluids injurious to carbon steel which comprises rolling a sheet of alloy steel resistant to attack by said fluids into tubular form and welding the meeting edges, heat treating the tube to anneal the seam, superimposing a sheet of similar alloy steel around said tube, leaving passages between the sheets and welding the meeting edges of said second sheet, heat treating the structure to anneal the welds, wrapping a sheet of plain carbon steel around said structure and welding the seam, heat treating the tube to anneal the alloy sheet under the last weld, positioning a closure member of alloy steel at each end of the tubular section and welding the circumferential seams, stress relieving said circumferential seams by heat treatment, superimposing additional layers of carbon steel to build up the wall to desired thickness, welding the meeting edges of each layer, welding the end edges of said layers to said closure members, and providing direct vent openings in the outer layers to communicate with said passages to prevent fluid under excessive pressure from contacting and penetrating the carbon steel layers.

2. The method of fabricating the wall of a multilayer pressure vessel suitable for containing fluids that are readily injurious to carbon steel which comprises rolling a sheet of alloy steel which is resistant to corrosion by said fluids into tubular form and welding the meeting edges, heat treating the tube to anneal the seam, tack welding strips of similar alloy to the outer surface of the tube to provide a series of narrow shallow channels, superimposing a layer of alloy steel tightly over said strips and welding the meeting edges, heat treating the structure to anneal the welded zones, wrapping a sheet of plain carbon steel around said structure and welding the seam, heat treating the tube to anneal the outer alloy sheet at the zone of the last welded seam, welding several of such tubular members end to end to provide a vessel of the desired length, welding closure members to each end, heat treating the circumferential seams, superimposing additional layers of carbon steel to build up the wall to desired thickness, welding the meeting edges of each layer, welding the end edges of said layers to each other and to said closure members, and providing direct vent openings in the outer layers to communicate with said series of channels to prevent fluid under excessive pressure from contacting and penetrating the carbon steel layers.

FREDERICK K. ZERBE.